United States Patent [19]

Watanabe et al.

[11] Patent Number: 4,956,044
[45] Date of Patent: Sep. 11, 1990

[54] TAB SURFACE-PROTECTIVE PAPER SEPARATING DEVICE

[75] Inventors: Takemi Watanabe, Toyonaka; Noriyuki Shiba, Tokyo, both of Japan

[73] Assignee: Kabushiki Kaisha Kaneda Kikai Seisakusho, Osaka, Japan

[21] Appl. No.: 316,904

[22] Filed: Feb. 28, 1989

[30] Foreign Application Priority Data

Mar. 3, 1988 [JP] Japan .................................. 63-28658

[51] Int. Cl.⁵ .............................................. B32B 31/18
[52] U.S. Cl. ...................................... 156/350; 156/64; 156/344; 156/584
[58] Field of Search ................... 156/344, 584, 64, 350

[56] References Cited

U.S. PATENT DOCUMENTS

| | | | |
|---|---|---|---|
| 3,996,127 | 12/1976 | Rautimo et al. | 156/584 X |
| 4,183,751 | 1/1980 | Matsumoto et al. | 156/584 X |
| 4,685,991 | 8/1987 | Herrmann et al. | 156/344 |
| 4,724,032 | 2/1988 | Kay | 156/344 |

*Primary Examiner*—Robert A. Dawson
*Attorney, Agent, or Firm*—Griffin Branigan & Butler

[57] ABSTRACT

This tab surface-protective paper separating device is what removes from a tab stuck on the leading web end of a paper roll the protective paper which is attached to the outer surface of the tab except on portions along its edges; it is comprised of a table board upon which a leading web end with a tab stuck thereon is brought, a scraper which is designed to be moved transversely along the table top and is capable of being wedged into inadhesive peripheral points between the base tab and its protective paper, and a gripping claw for holding the protective paper between the scraper and itself in coordination with the wedging movement of the scraper. In seizing the protective paper between the scraper and the gripping claw, the device wedges the scraper between the tab and its protective paper with the help of ejection of compressed air. The protective paper is automatically removed from the tab as the scraper and the claw, both holding the protective paper therebetween, are moved away from the table board.

3 Claims, 11 Drawing Sheets

TAB SURFACE-PROTECTIVE PAPER SEPARATING DEVICE

FIELD OF THE INVENTION

The present invention relates to a device used in an automatic device for preparing paper rolls for web pasting in a rotary press printing system and designed to automatically remove the outer surface-protective paper from a tab stuck on a web end.

PRIOR ART

Generally in a printing system using a rotary press, when the paper supply loaded in a roll is running out (hereinafter referred to as "expiring/first paper roll-/web"), the leading web end of a new paper supply in a roll (hereinafter referred to as "new/second paper roll-/web") is pasted automatically to the expiring web at a position between the expiring paper roll on the reel and the rotary press so that the printing paper can be fed continuously.

This automatic pasting of a new web to an expiring one requires the new paper roll to be prepared beforehand therefor: as a preliminary step a leading portion of the new web needs to be cut off, for one thing, to remove the soiled portion from the new paper roll and this cut web end must be provided with an adhesive device for the web pasting.

For many years in the past this preparation of new paper rolls has been practiced manually and, therefore, ineffficiently and at the expense of high labor cost.

As a means of solving this problem the inventors had developed a device which automatically carries out this preparation for web pasting. Already, Japanese patents have been applied for in respect of this automatic device for preparing paper rolls for web pasting and its mechanism has been officially disclosed for public inspection under No. Toku Kai Sho 62-32037.

In such an automatic procedure for web pasting, besides the above-mentioned steps, i.e., shaping the web end and attaching an adhesive device, attachment of a tab to the leading web end to keep it from dangling from the paper roll is also carried out automatically. The tab is of paper, having the middle portion of its outer surface and portions along two side edges on the inner side coated with an adhesive, and in order to protect the adhesive portions of the tab, the tab is provided with protective paper in strips of the same shape as the tab attached to each of the outer and inner sides of the tab.

In attaching such a tab to a paper roll one end of a tab on the inner side having been stripped of the protective paper is attached to the leading web end and the opposite end to the circumferential surface of the paper roll so that the tab fastened in position can keep the leading web end from dangling from the paper roll.

In pasting a new web to an expiring one a new paper roll whose leading web end has been prepared for the splice, with such a tab attached in place, while it is being revolved in the same direction circumferentially as the expiring web, is pressed against the splice point of the expiring web so that the leading web end of the new roll may be attached to the splice point by means of web pasting adhesive. With the protective paper removed from the outer surface beforehand at this step, the tab is also attached to the splice point by adhesion of its outer side to the expiring web. The tab is ripped apart by the pull given to it as the leading web end of the new roll is drawn with forward movement of the splice point, causing the leading web end to be unfastened from the circumferential surface of the new paper roll. Finally, the section containing the splice point in the printed web is cut away therefrom.

Even in such a web preparation method, however, the procedure has necessarily involved a manual step in removing the protective paper from the outer surface of the tab, this particular step defying full automatization of the web pasting procedure including the preparation. Noticeably in a big printing shop where a number of rotary presses are simultaneously at work for mass printing, for all the efforts, perfection has been unattainable in streamlining the operation in efficiency and in economizing on labor cost because of inclusion of the manual step.

SUMMARY OF THE INVENTION

The object of the present invention is to provide a device used in an automatic procedure for web pasting, which is designed to automatically remove the protective paper from the outer surface of a tab attached to a leading web end so that full automatization may be accomplished in the web preparation step.

To accomplish this object, there is provided a device which is comprised of: a table board upon which a leading web end having a tab stuck thereon is brought, said tab having protective paper attached by adhesion to its outer surface, except on portions along its edges; a scraper which is moved transversely along the table top and capable of being wedged into inadhesive points along the edges between the tab and its protective paper; a gripping claw for holding the protective paper between the scraper and itself in coordination with the wedging movement of the scraper; and a mechanism for moving the scraper and the gripping claw together with the protective paper therebetween away from the table board. In seizing the protective paper between the scraper and the gripping claw, the device wedges the scraper between the tab and its protective paper with the help of ejection of compressed air. The protective paper is automatically removed from the tab as the scraper and the gripping claw, holding the protective paper therebetween, are moved away from the table board.

Other objects, features, aspects and advantages of the present invention will become apparent upon consideration of the following detailed description of the invention when taken in conjunction with the accompanying drawings.

DESCRIPTION OF A PREFERRED EMBODIMENT

Figure 1:
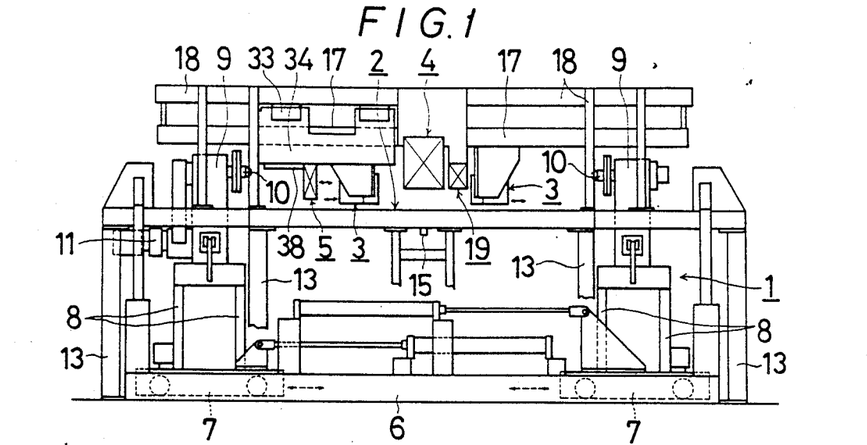
FIG. 1 represents in a front elevation an automatic device for preparing paper rolls for web pasting which is equipped with a tab surface protective paper-separating device embodying the present invention.
Figure 2:
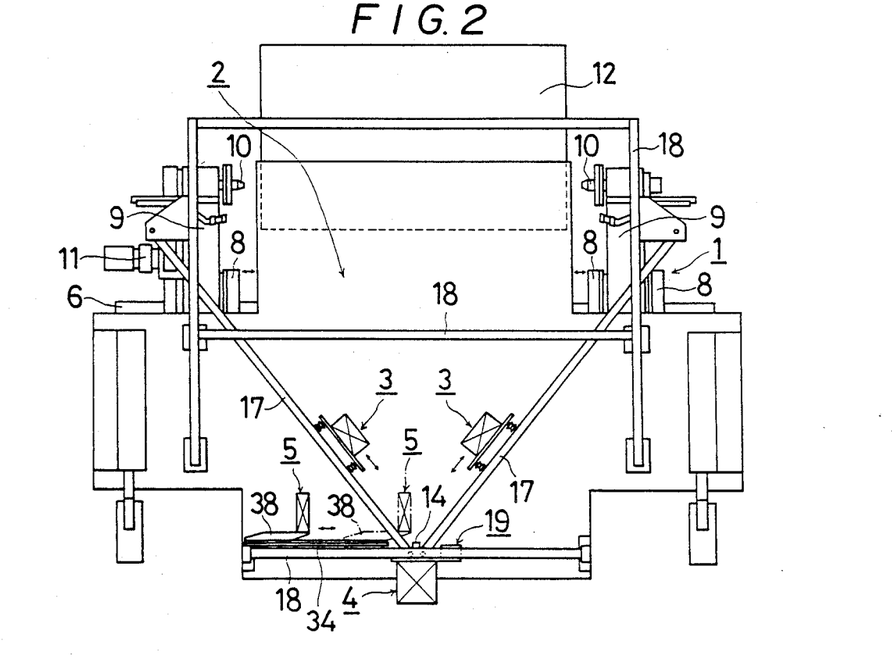
FIG. 2 represents the web-preparing device in FIG. 1 in a top view.
Figure 3:
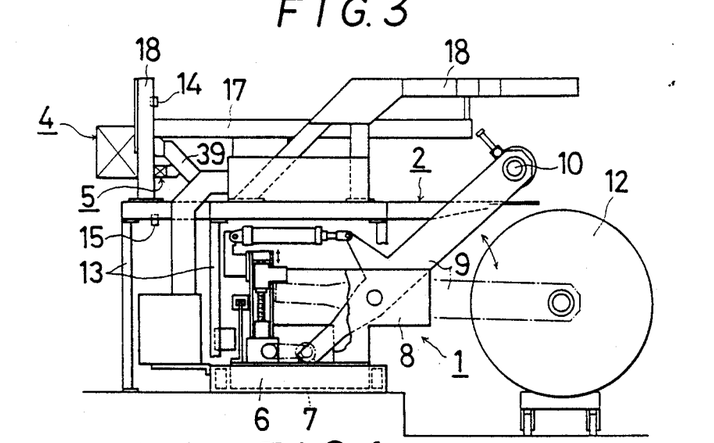
FIG. 3 represents the web-preparing device in FIG. 1 as seen from the right side.
Figure 4:
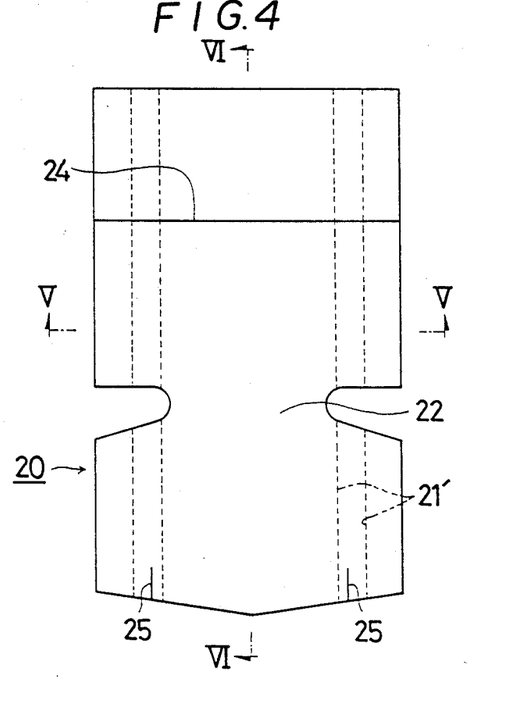
FIG. 4 represents a tab relevant to the present invention in a top view.
Figure 5:
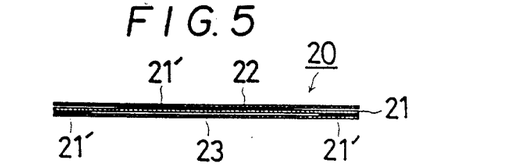
FIG. 5 illustrates the tab in FIG. 4 in a sectional view taken along the plane V—V.
Figure 6:
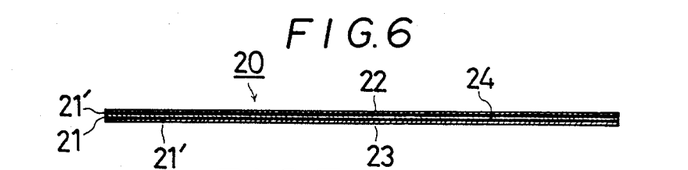
FIG. 6 illustrates the tab in FIG. 4 in a sectional view taken along the plane VI—VI.

Referring to FIGS. 1, 2 and 3, there is shown an automatic device for preparing paper rolls for web pasting which is equipped with a tab surface protective paper-separating device embodying the present invention. This web-preparing device is comprised of a support framework 1, table board 2, pair of principal preparing means 3, tab-attaching means 4, and tab surface protective paper-separating device 5 (hereinafter referred to as "separating device").

As shown in FIGS. 1 and 3, said support framework 1 is comprised of a base frame 6, traveling movable frames 7, support plates 8 mounted on said traveling movable frames 7, support arms 9 which are held by said support plates 8 and designed to be moved in the manner of swaying, rotatable pins 10 joined with said support arms 9, and drive means 11 for turning said rotatable pins 10. A paper roll 12 to be prepared is held rotatable in the two circumferential directions when supported.

Said table board 2, upon which the leading web end drawn out from a paper roll 12 is brought, as shown in FIG. 2, has a little larger breadth than the paper roll 12, and is supported on support legs 13 and fixed at a high position in the support framework 1, sharing substantially the same level with the uppermost surface of the paper roll 12. The table board 2 is provided in its upper side with a means for vacuum suction (not shown in the drawings) which holds the leading web end of the paper roll 12 by suction. The table board 2 permits light to pass through at the part where the pointed end of the leading web of the paper roll 12 is brought and there are provided over it a photoelectric switch 14 for light projection and under it a photoelectric switch 15 for light reception. By means of these photoelectric switches 14 and 15 it is checked whether or not a tab 21 has been attached to the leading web end of a paper roll 12.

Said pair of principal preparing means 3, as shown in FIG. 2, are mounted respectively on a pair of guide members 17 each with a guide rail 16, the guide members 17 being arranged over the table board 2 in such a way as to converge at one point and each principal preparing means 3 being mounted on the respective guide member 17 in such a way as to be reciprocally movable therealong. The guide members 17 are fixed respectively to support frames 18 which stand on the table board 2 in an arrangement in which the guide members 17 diverge from each other toward the paper roll 12 on the reel each at an angle of about 45° to its axis. Each of the principal preparing means 3 is comprised of a cutter device (not shown in the drawings) which cuts the leading web end held on the table board 2, and an adhesive layer-forming device (not shown in the drawings) which forms an adhesive layer along a leading web end for web pasting by applying two sides-coated adhesive tape therealong. The cutter device and the adhesive layer-forming device are actuated to form a V-shaped incision and an adhesive layer for web pasting at a leading web end as each of the principal preparing means 3 is moved in synchronization with the other in the same direction along the guide rail 16.

A transversely cutting means 19 which cuts off a V-shaped portion at a leading web end transversely in parallel with the axis of the paper roll 12 is mounted on one of said support frames 18. Also on this support frame 18 is mounted said tab-attaching means 4 at such a position as to have under it the leading web end brought upon the table board 2 with a function to attach a tab assembly 20 to the leading web end.

Figure 7:
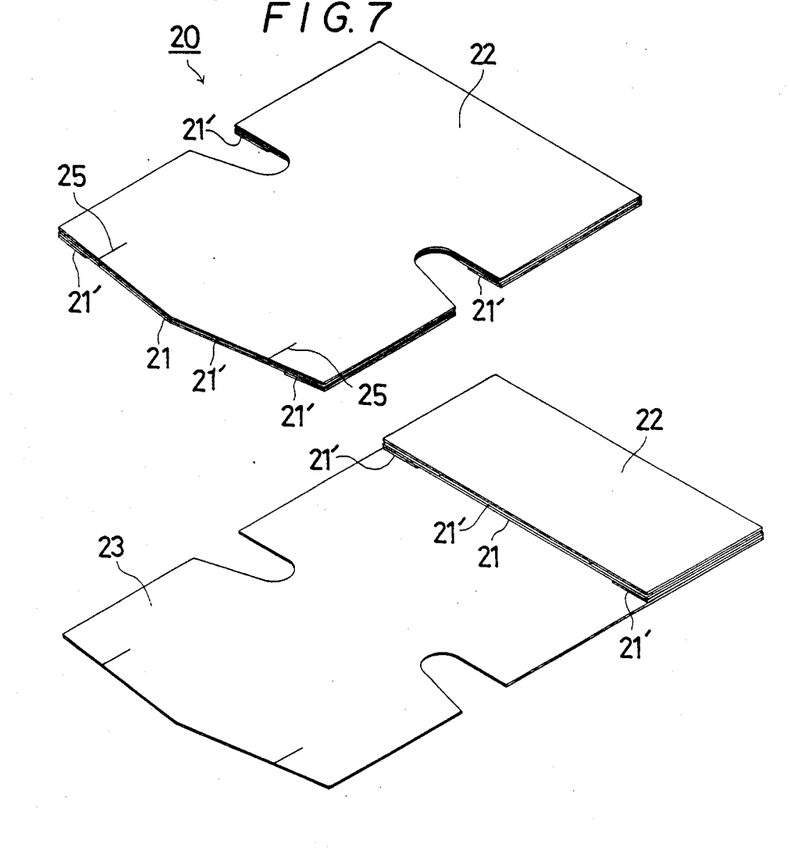
FIG. 7 represents in a perspective a tab separated from its underside protective paper relevant to the present invention.

A tab assembly 20 mentioned above is designed to fasten the leading web end to the circumferential surface of the paper roll 12; as shown by FIGS. 4 through 7, it is comprised of a base tab 21 made of paper and coated with an adhesive 21' at the middle portion of its outer surface and at two side portions of its underside and a strip of surface protective paper 22 pasted on the outer surface of the base tab 21 and a strip of underside protective paper 23 pasted on the underside of the tab 21. The protective paper strips 22, 23 are of the same shape as the base tab 21 and a tab is assembled with the outer surface protective paper strip 22 separated from the base tab 21 at a middle portion. As shown in FIG. 7, the base tab 21 and the outer surface protective paper strip 22 both have an incision 24 for separation by which the tab assembly is divided into a forward portion used as a tab and an end portion used for holding by an underside protective paper separating means in separating the underside protective paper strip 23 from the base tab 21. From the foremost edge of the tab assembly 20 there are formed a pair of incisions 25 for ripping each at a position between the middle adhesive portion 21' and the side adhesive portion 21'. In continuously feeding a new paper roll 12 to a rotary press by web pasting the tab 21 is designed to be ripped asunder from and along these incisions 25 so as to separate the leading web end from the circumferential surface of the new paper roll 12.

In attaching a tab 21 to a paper roll 12 by means of a tab-attaching means 4, as shown in FIG. 7, the tab 21, together with the outer surface protective paper 22 thereon, is separated from the underside protective paper 23 and along the incision 24 from the holding end portion and attached to the paper roll 12 with a portion of its underside at one end to the leading web end.

This description of the invention refers to an embodiment which is used in conjunction with said support framework 1, said table board 2, said principal preparing means 3, and said transversely cutting means 19, which all are described with respect to mechanical features etc. in the disclosure of Japanese Patent Publication for Public Inspection under No. Toku Kai Sho 62-32038 and in conjunction with said tab-attaching means 4 which is in the disclosure under No. Jitsu Kai Sho 62-78581.

A separating device 5 embodying this invention is comprised of, as shown in FIGS. 8 through 11, a paper-pressing mechanism 26, scraper 27, gripping claw 28, compressed air-ejection nozzles 29, lifting mechanism 30, and an inspection means for protective paper removal 31. After a tab has been attached in place, a transporting mechanism 32 provided at a support frame 18 brings the separating device 5, as shown in FIG. 2, from its standby position, which is immediately above one side edge of the table board 2 (the location is shown in continuous lines in FIG. 2 and in dash-dot lines in FIG. 8), transversely along the table top 2 to the separating position, under which comes the leading web end of a paper roll 12 (the location is shown in dash-dot lines in FIG. 2 and in continuous lines in FIG. 8).

Figure 8:
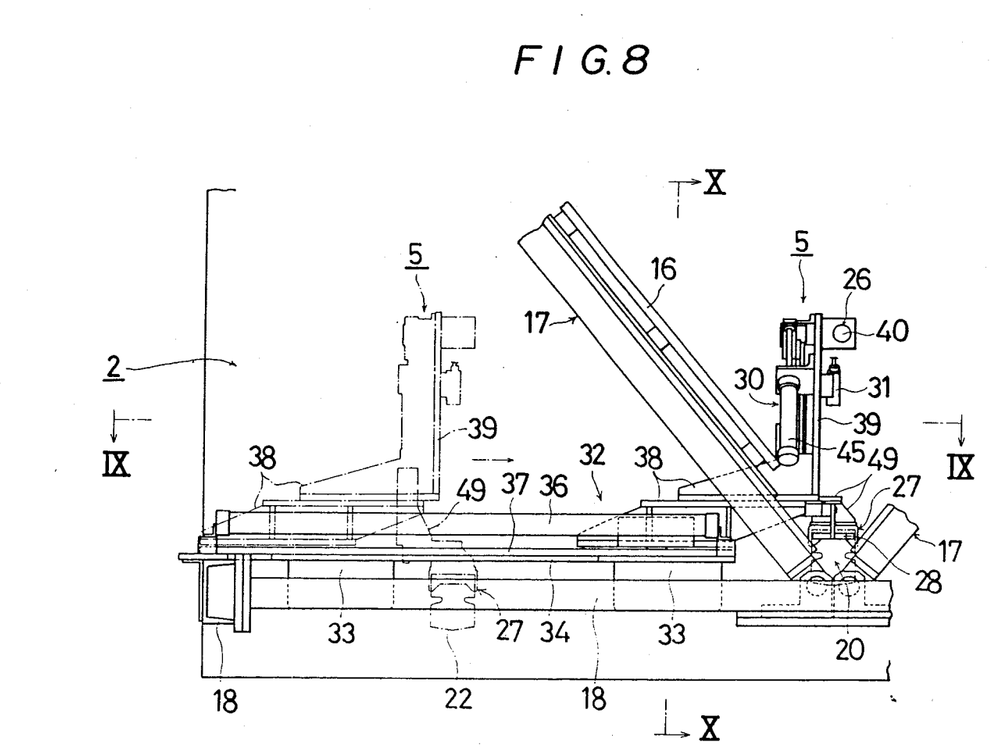
FIG. 8 is an enlarged detail of the tab surface protective paper-separating device shown in FIG. 2.
Figure 9:
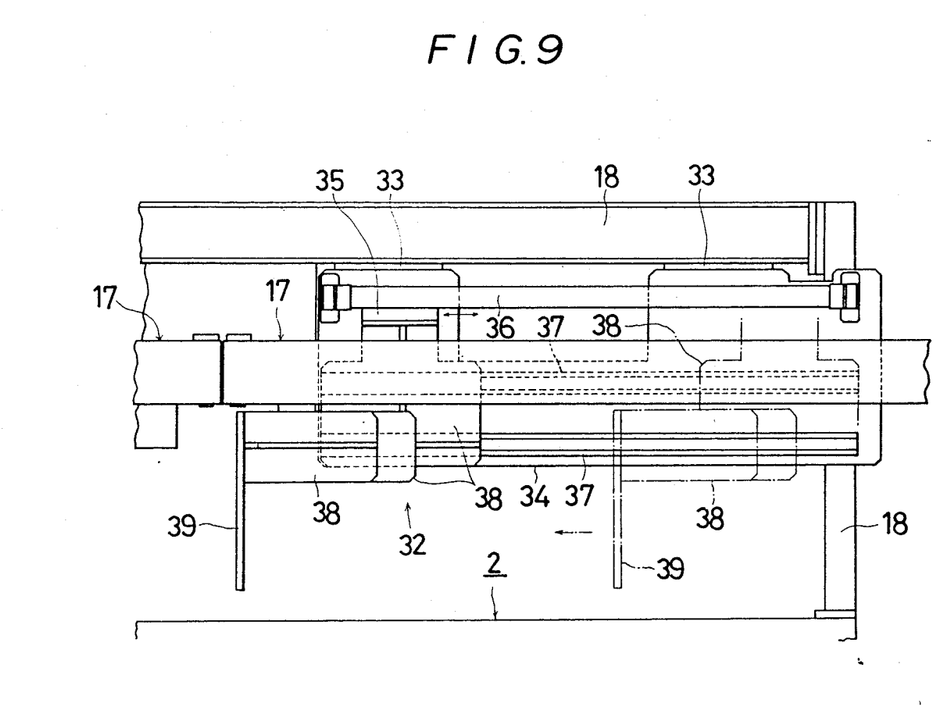
FIG. 9 represents the device in FIG. 8 in a sectional view taken along the plane IX—IX.

Said transporting mechanism 32 is comprised of, as shown in FIGS. 8 and 9, a fixed plate 34 fixed to the support frame 18 by means of brackets 33, rodless cylinder 36 which is fixed to the fixed plate 34 and to which is attached a movable member 35 designed to be moved reciprocally along the cylinder tube, guide member 37 provided along the rodless cylinder 36 and fixed to the fixed plate 34, traveling member 38 slidably supported by said guide member 37 and joined fast with the movable member 35 attached to the rodless cylinder 36, and arm 39 extended sidewise from one end of the traveling member 38. To this arm 39 are attached the paper-pressing mechanism 26, scraper 27, gripping claw 28, compressed air-ejection nozzles 29, lifting mechanism 30, and an inspection means for protective paper removal 31, all mentioned in the preceding paragraph.

The separating device 5 is moved reciprocally from said standby position at one side of the table 2 to said separating position as the movable member 35 attached to the rodless cylinder 36 reciprocally moves, causing the traveling member 38 and the arm 39 to move along the guide member 37. The movement of the traveling member 38 and the arm 39 is timed in such a way relative to the movement of the principal preparing means 3 that the separating device 5 is brought to the separating position, that is, immediately above the leading web end, when it separates the protective paper 22 from the tab 21 and otherwise placed at the standby position so as not to obstruct the movement of the principal preparing means 3.

A movement mechanism applicable to the above-mentioned step of operation is not confined to the example 32 in the foregoing description but any mechanism being capable of moving a separating device 5 reciprocally from the standby position to the separating position is applicable to the practice of this invention.

Said paper-pressing mechanism 26 is designed to press the leading web end against the table top 2 when it is drawn out from a paper roll 12 so that the outer surface protective paper 22 can be removed from the tab 21 easily. This mechanism is comprised of a fluid pressure cylinder 40 attached to the arm 39 and a cushioned pressing member 41 which is fixed to the piston rod of the fluid pressure cylinder 40 and designed to press the substantially V-shaped leading web end of a paper roll 12.

A paper-pressing mechanism applicable to the above-mentioned step of operation is not confined to the example 26 in the foregoing description but any mechanism being capable of pressing a leading web end against the table top 2 is applicable to the practice of this invention. For example, the pressing member 41 may be designed to be moved up and down by a solenoid or the like in pressing a leading web end.

Said scraper 27 is attached to the arm 39 and operated by a lifting mechanism 30 for the up-and-down movement of the scraper and by a traverse mechanism 42 for its transverse movement; it is wedged into the inadhesive interspaces between the base tab 21 attached to a leading web end and the outer surface protective paper 22 thereupon in such a manner as to lift the latter from the former.

The scraper 27 has two forked ends which extend parallel to the table top 2 and in the form of horizontal blades 27'; these blades 27' make their way into the inadhesive points under the outer surface protective paper 22.

Upon movement of the separating device 5 to said separating position, the lifting mechanism 30 and the traverse mechanism 42 are actuated to move the scraper 27 in a cycle which starts with movement from the starting point immediately above the tab 21 (the location is shown by broken lines in FIG. 10 and by continuous lines in FIG. 12) to a start-separating point located substantially on the same plane as the tab 21 and close to its edge (the location is shown by dash-dot lines in FIG. 10 and by continuous lines in FIG. 13), followed by movement from there by wedging to a protective paper-separating point, i.e., the inadhesive point under the outer surface protective paper 22 (the location is shown by continuous lines in FIGS. 10 and 14), next to a confirm-protective paper separation point where the outer surface protective paper 22 has been separated halfway (the location is shown by continuous lines in FIG. 15), next to a complete-protective paper separation point where the outer surface protective paper 22 has been removed completely (the location is shown by dash-two dots lines in FIG. 10 and dash-dot lines in FIG. 15), and ends with returning to said starting point.

After the scraper 27 has been brought from the starting point down to the start-separating point by the lifting mechanism 30, the traverse mechanism 42 brings the scraper 27 horizontally to the protective paper-separating point and its forked horizontal blades 27' by wedging to the inadhesive points under the outer surface protective paper 22.

Figure 10:
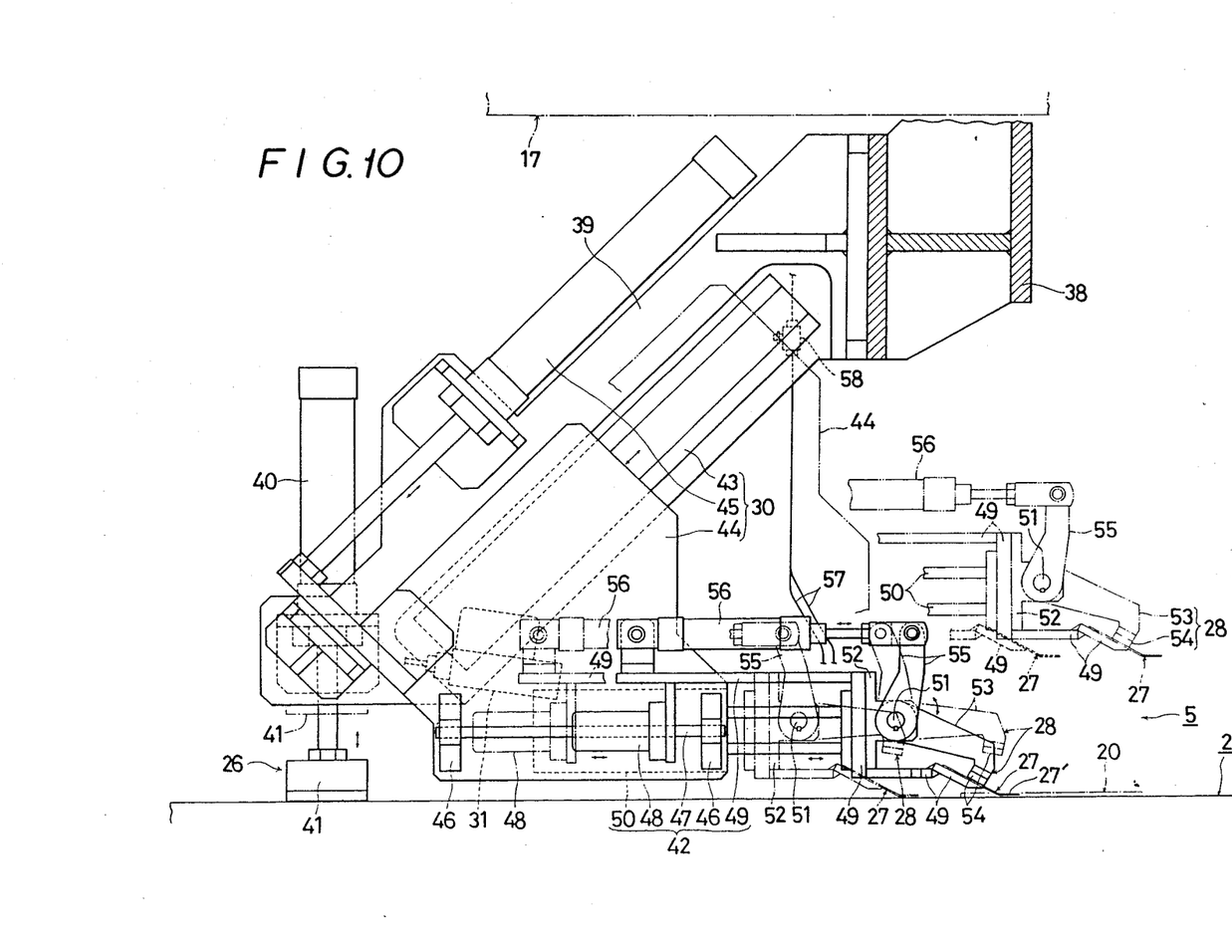
FIG. 10 represents the device in FIG. 8 in a sectional view taken along the plane X—X.
Figure 11:
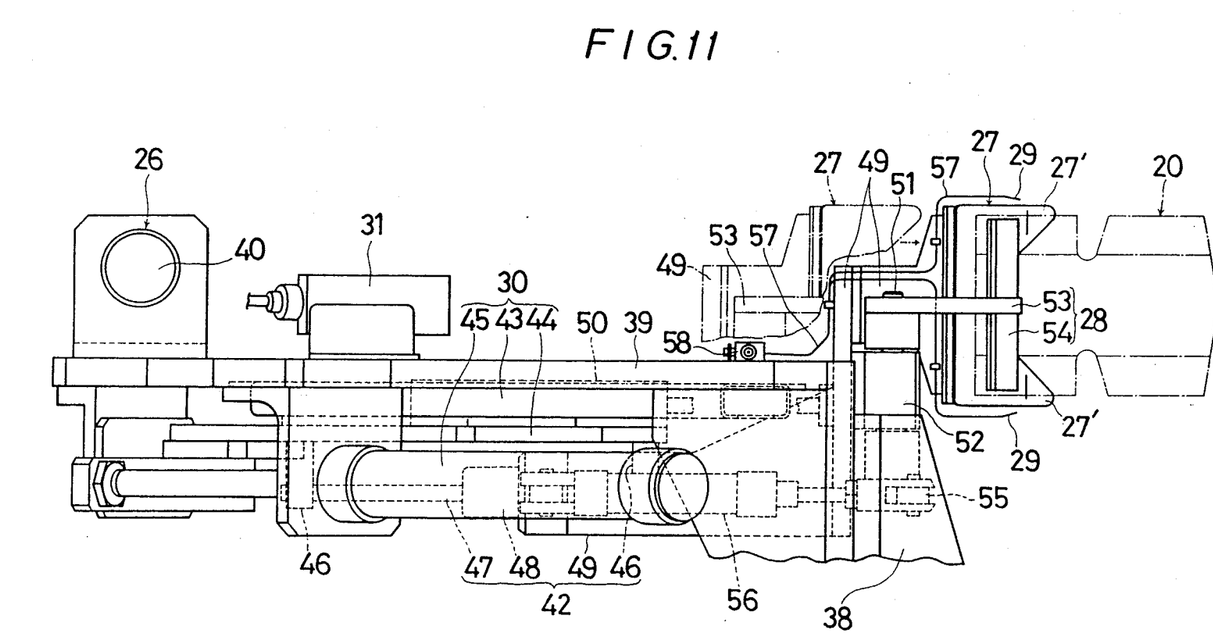
FIG. 11 is an enlarged detail of the key mechanism of the device in FIG. 8.

Said lifting mechanism 30, which is designed to move the scraper 27 in synchronization with the gripping claw 28 (described later) up and down, is comprised of, as shown in FIGS. 10 and 11, a guide member 43 which is attached in a slanting position to the arm 39, lifting member 44 which is slidably attached to the guide member 43 and moved up and down in slanting directions: and fluid pressure cylinder 45 which is interposed between the lifting member 44 and the arm 39 and designed to move the lifting member 44 up and down along the guide member 43, said scraper 27 and said gripping claw 28 both being attached to the lifting member 44 with the traverse mechanism 42 interposed therebetween.

Said traverse mechanism 42, which is designed to move the scraper 27 in synchronization with the gripping claw 28 (described later) in horizontal directions, is comprised of, as shown in FIGS. 10 and 11, a horizontal shaft 47 which is held by the lifting member 44 with bearings 46 therebetween, support member 49 which is slidably supported by the horizontal shaft 47 with a bush 48 as a holding member, and fluid pressure cylinder 50 interposed between the lifting member 44 and the support member 49, the scraper 27 and said gripping claw 28 being attached to the forward end of the support member 49.

A lifting mechanism and a traverse mechanism which are applicable to the above-mentioned step of operation are not confined to the examples 30 and 42 in the foregoing description but any mechanisms which are capable of bringing the scraper 27 to the positions in the description above are applicable to the practice of this invention.

Said gripping claw is designed to seize the outer surface protective paper 22 between the scraper 27 and itself and is timed to operate when the scraper 27 has wedged between the tab 21 and the protective paper 22; it is attached to the forward end of the support member 49 and designed to be turned up and down.

The gripping claw 28 is comprised of an arm 53 which is attached to the forward end of the support member 49 with a support pin 51 and a bearing 52 as supporting members and in such a way as to be turned up and down and a claw 54 which is attached to the forward end of the arm 53 and designed to press against the upper side of the scraper 27; the gripping claw is turned up and down by a fluid pressure cylinder 56 and an operational arm 55 which is interposed between the support member 49 and the support pin 51.

Said compressed air-ejection nozzles 29 are provided as a means to make the scraper 27 wedge into the interspaces between the tab 21 and the outer surface protective paper 22 with ease and certainty by raising the protective paper 22 in the air by blowing compressed air into said interspaces. As shown in FIG. 11, these nozzles 29 are provided in a pair each adjacently to the respective horizontal blade 27' of the scraper 27 and connected to the source through a flexible tube 57 and a throttle valve 58.

Said inspection means for protective paper removal 31, attached to the arm 39, is designed to detect removal of the outer surface protective paper 22. A reflex type photoelectric switch is in use therefor.

A separating device 5 embodying the present invention is designed to operate as follows.

Upon formation of a substantially V-shaped incision and adhesive layers by principal preparing means 3 in the leading web end drawn out upon a table board 2 from a paper roll 12, a transporting mechanism 32 brings a separating device 5 from the standby position at one side of the table board 2 to the separating position, which is immediately above the leading web end.

Figure 12:
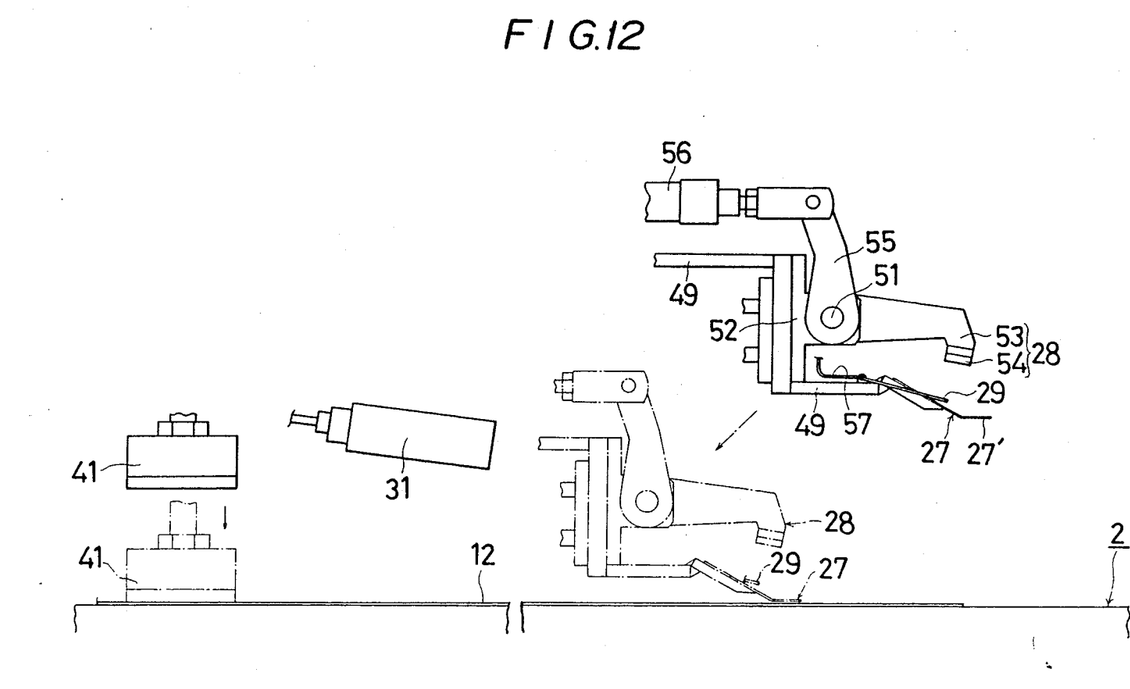
FIGS. 12 through 15 illustrate the mechanical procedure in which the protective paper is separated from the outer surface of a tab relevant to the present invention.

Following the traverse of the separating device 5 to the separating position, a paper-pressing mechanism 26 is actuated, causing a pressing member 41 to press the leading web end against the table top 2, as shown by dash-dot lines in FIG. 12, and while the leading web end is being held against the table top 2, a portion of the substantially pointed V-shaped leading web end is cut transversely by a transversely cutting means 19 and simultaneously the leading web end is cut away along the substantially V-shaped incision, forming the web end into substantially a V shape.

Figure 13:
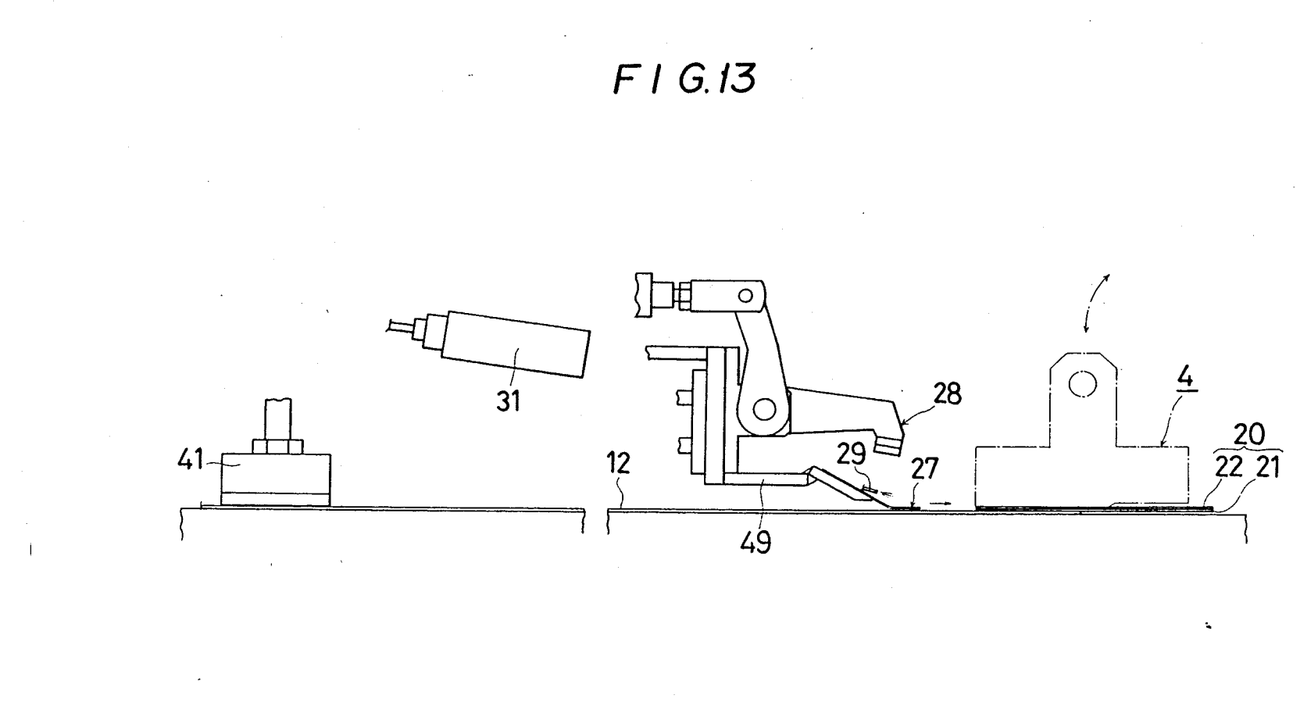

Upon elimination of the foremost portion of the web end, a lifting mechanism 30 brings a scraper 27, gripping claw 28 and compressed air-ejection nozzles 29, all of the separating device 5, from the starting point down to the start-separating point, as shown in FIG. 12, and then a tab-attaching means 4 separates a base tab 21 together with its outer surface-protective paper 22 thereon from the underside protective paper 23 and along an incision 24 for separation and attaches the tab by adhesion to the leading web end, i.e., one end edge portion of the tab to the outer surface of the foremost portion of the substantially V-shaped web end, as shown in FIG. 13.

Upon attachment of the tab 21 to the leading web end, compressed air is ejected through the nozzles 29 to check whether or not the tab 21 is attached fast in place; photoelectric switches 14 and 15 each provided respectively above and under the table board 2 detect the result. If the tab 21 is blown away by the compressed air, the tab-attaching means 4 is actuated to attach a second tab 21 to the leading web end.

Figure 14:
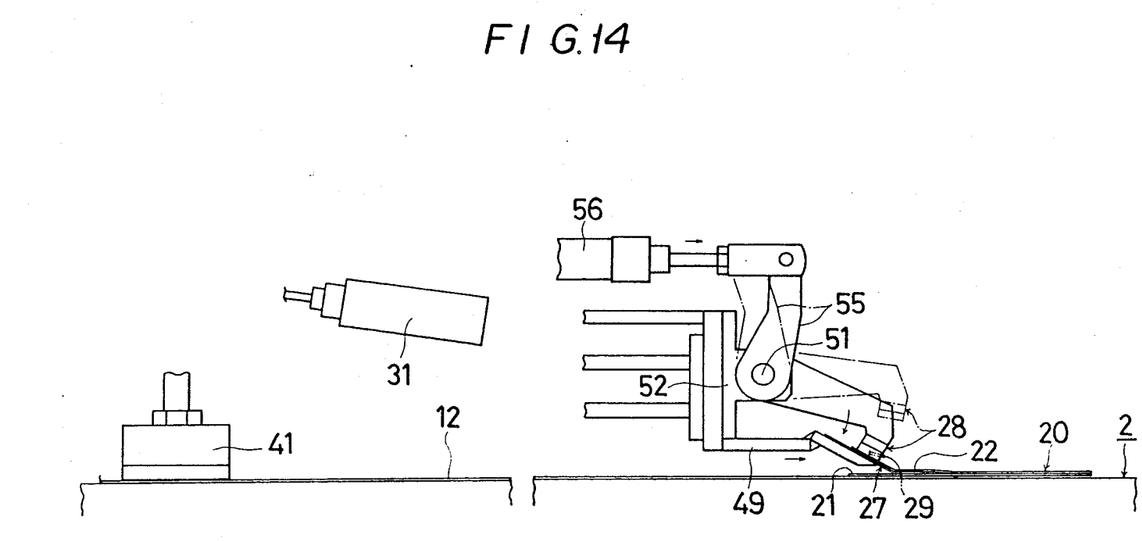

When the tab 21 is fast in place, a traverse mechanism 42 is actuated to bring the scraper 27 from the start-separating point horizontally to the protective paper-separating point where the tab is and its horizontal blades 27' by wedging into the inadhesive point under the outer surface protective paper 22 in such a manner as to raise its inadhesive side portions, as shown in FIG. 14, while compressed air is being ejected through the nozzles 29. By virtue of this ejection of compressed air lifting the outer surface protective paper 22 from the base tab 21, the scraper 27 can be brought under the surface protective paper 22 with certainty and satisfatorily.

In coordination with the movement of the scraper 27 into the inadhesive point under the outer surface protective paper 22 the gripping claw 28 is actuated to turn downward so as to seize the protective paper 22 between the scraper 27 and itself, as shown in FIG. 14.

Upon seizing the outer surface protective paper 22, both the scraper 27 and the gripping claw 28 are lifted by the lifting mechanism 30 so as to separate the outer surface protective paper 22 from the base tab 21. What the protective paper 22 has become separated from the base tab 21 halfway after being lifted by a certain height, as shown by continuous lines in FIG. 15, a photoelectric switch 31 is actuated to detect whether or not the scraper 27 and the gripping claw 28 are holding the protective paper 22 therebetween. If the protective paper 22 is not being held, the scraper 27 is turned back to the start-separating point, from which it repeats separating the protective paper 22.

Figure 15:
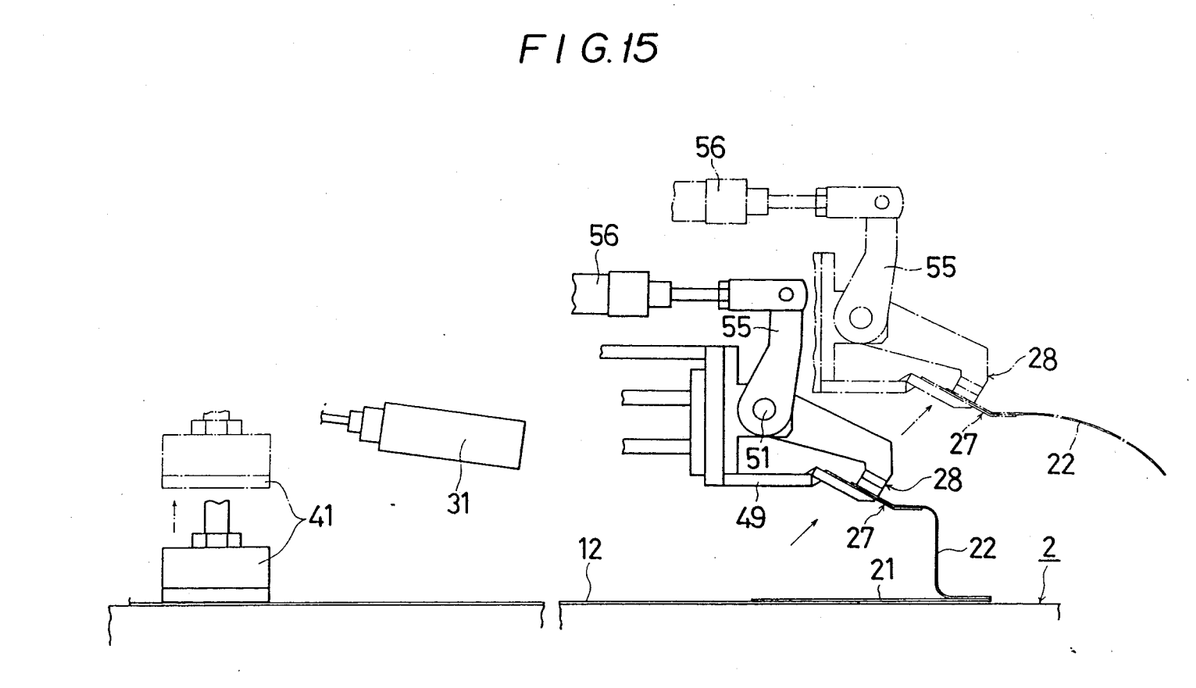

Upon detection of firm seizure of the outer surface protective paper 22, the scraper 27 and the gripping claw 28 are raised further upward by the lifting mechanism 30 so as to separate the protective paper 22 completely from the base tab 21, and the pressing member 41 is lifted, as shown by dash-dot lines in FIG. 15.

Finally, the whole unit of the separating device 5 is returned by the transporting mechanism 32 from the separating position to the standby position, where the outer surface protective paper 22 removed is disposed of as waste, as shown by dash-dot lines in FIG. 8.

The outer surface protective paper 22 which covers a tab 21 on the leading web end of a paper roll 12 thus can be automatically removed in the above-mentioned procedure.

All the above-mentioned operations of the devices are automatically conducted according to predetermined signals which come from control units.

Obvious changes may be made in the specific embodiment of the invention described herein, such modifications being within the spirit and scope of the invention claimed, and it is indicated that all the details contained herein is intended to be illustrative and not limiting in scope.

What is claimed is:

1. A device for separating a protective paper from a tab, said protective paper being adhesively attached to the tab except at non-adhesive regions along the edges of the tab, and said tab being attached to the leading web end of a paper roll said device comprising:
    a table board onto which said tab and leading web end of said paper roll are brought;

a scraper having blade means;

means for inserting said blade means between said protective paper and said tab at said non-adhesive regions;

a gripping claw;

means for moving said gripping claw in coordination with movement of said scraper to grip said protective paper between said gripping claw and said blade means while said blade means are inserted at said non-adhesive regions;

means for moving said gripping claw and said scraper away from said table board while said protective paper is gripped between said gripping claw and said blade means, whereby said protective paper is removed from said tab; detection means operable as said gripping claw and said scraper are moved away from said table board for detecting that the protective paper is not gripped between the gripping claw and the blade means, and means responsive to said detection means for actuating said means for inserting said blade means and actuating said means for moving said gripping claw.

2. A device as claimed in claim 1 wherein said means for moving said gripping claw and said scraper away from said table board comprises means for moving said gripping caw and said scraper away from said table board in a plane normal to said table board.

3. A device as claimed in claim 2 and further comprising means for moving said scraper and said gripping claw along said table board in a direction transverse to the direction in which said tab and leading web end of said paper roll are brought onto said table board.

* * * * *